United States Patent Office 3,645,974
Patented Feb. 29, 1972

3,645,974
PIEZOELECTRIC CERAMIC COMPOSITIONS
Noboru Ichinose and Katsunori Yokoyama, Yokohama-shi, Harutoshi Egami, Tokyo, and Yoshikazu Tanno, Yokohama-shi, Japan, assignors to Tokyo Shibaura Electric Co., Ltd., Kawasaki-shi, Japan
Filed Mar. 13, 1969, Ser. No. 806,944
Claims priority, application Japan, Mar. 15, 1968, 43/16,470
Int. Cl. C04b 35/46, 35/48
U.S. Cl. 252—62.9                    1 Claim

ABSTRACT OF THE DISCLOSURE

Piezoelectric ceramic compositions consisting essentially of a basic composition indicated by the formula:

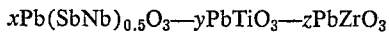

where:
$x = 0.5$ to $25.0$ mol percent
$y = 36.0$ to $55.5$ mol percent
$z = 53.5$ to $20.5$ mol percent
$x+y+z = 100$ mol percent and further containing at least one metal oxide selected from the group consisting of $ThO_2$ and $CeO_2$ in an amount of from 0.1 to 3 percent by weight based upon the basic composition.

---

The present invention relates to piezoelectric ceramic compositions, and more particularly to piezoelectric ceramic compositions mainly consisting of a basic composition formed of ternary oxides:

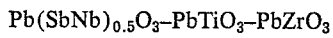

It is known that piezoelectric materials are employed in broad fields such as supersonic wave oscillation elements, ceramic filter elements, pickup microphones and oscillograph elements. Piezoelectric materials used in these applications are generally required to have a largest possible electro-mechanical coupling coefficient Kr and mechanical quality coefficient $Q_M$. For example, where a piezoelectric element is used as an electro-mechanical oscillation conversion element for a mechanical filter or an electro-sound oscillation conversion element associated with the oscillation of powerful supersonic waves, the greater the electro-mechanical coupling coefficient Kr, the higher the converting efficiency and in consequence the greater advantage for the formation of a circuit. Also, where a conversion is made among electro-mechanical sound oscillations, a large mechanical quality coefficient $Q_M$ minimises loss in an oscillation element and loss of energies.

Piezoelectric materials heretofore known include, for example, a solid solution of the so-called $Pb(Zr-Ti)O_3$ oxides consisting of substantially equal mols of $PbTiO_3$ and $PbZrO_3$. However, these piezoelectric materials have the drawbacks that they present considerable difficulties in sintering, and have a small mechanical quality coefficient $Q_M$ and a relatively small electro-mechanical coupling coefficient Kr, so that they are not fully satisfactory for practical use.

The present invention has been accomplished in view of the aforementioned circumstances for providing piezoelectric oxide materials whose electro-mechanical coupling coefficient and mechanical quality coefficient are sufficiently large and which are prominently stable at ambient temperatures as well as during a long-term use and moreover can be easily manufactured on an industrial scale. To that end, in one aspect of the present invention, we provide piezoelectric ceramic compositions consisting essentially of a basic composition indicated by the formula:

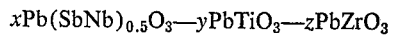

where:
$x = 0.5$ to $25.0$ mol percent
$y = 36.0$ to $55.55$ mol percent
$z = 53.5$ to $20.5$ mol percent
$x+y+z = 100$ mol percent In other aspects of the invention, the ceramic compositions also include appropriate amounts of a metal oxide selected from the group of $ThO_2$, $CeO_2$, $ThO_2$ mixed with $CeO_2$, $MnO_2$, $Cr_2O_3$, $NiO$, $CoO$ and $NiO$ mixed with $CoO$.

The present invention can be more fully understood from the following detailed description when taken in connection with the accompanying drawing.

FIG. 5 is a curve diagram denoting the relationship of the varied proportions of

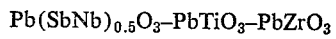

Figure 6:
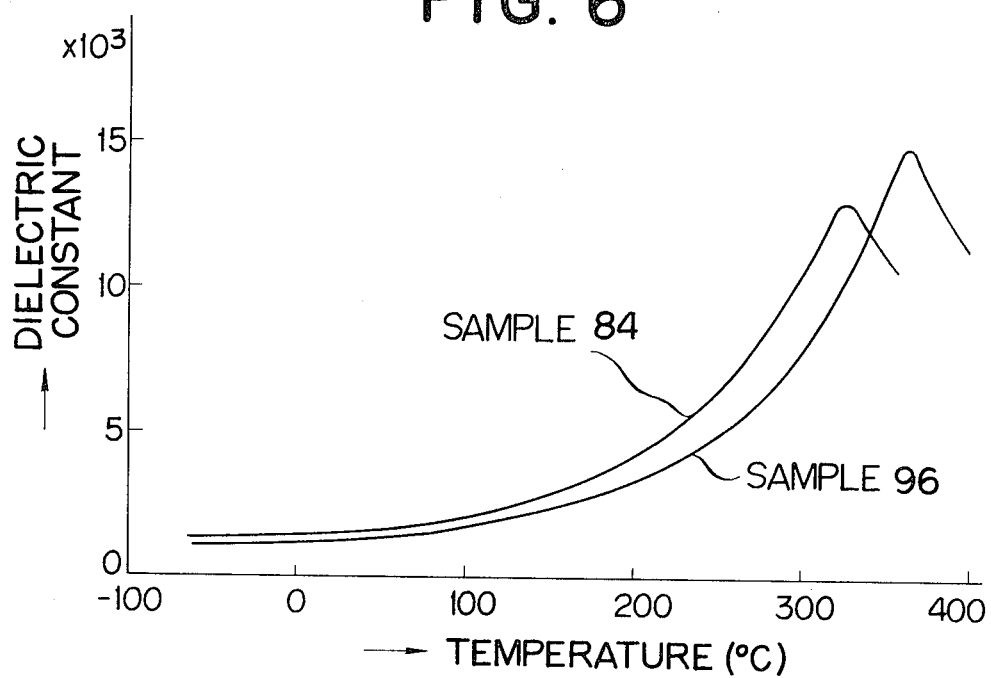
Figure 7:
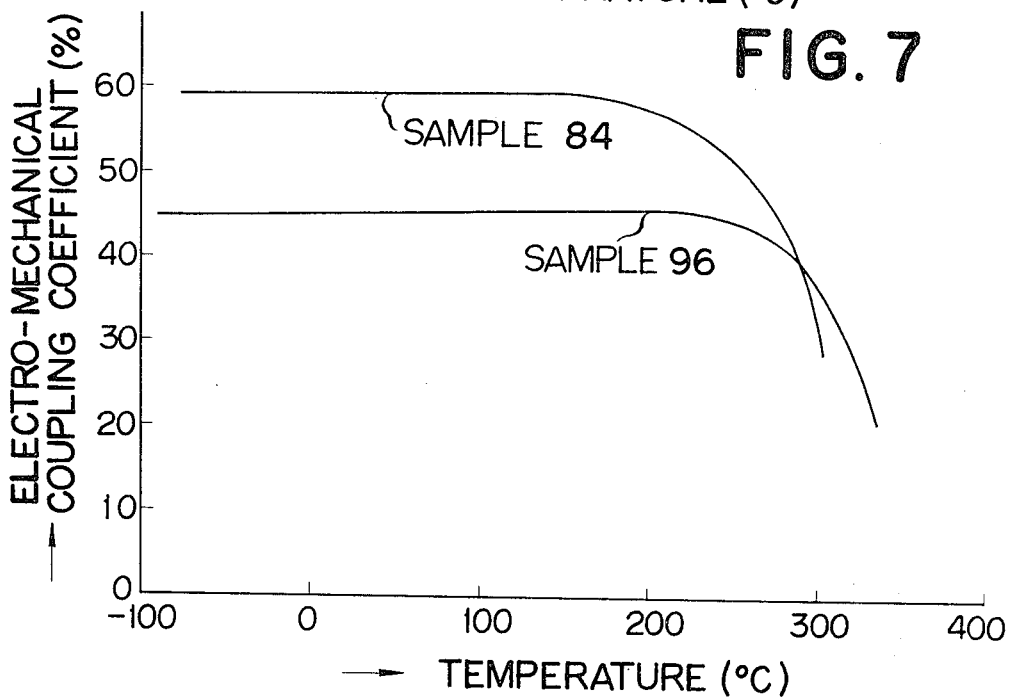
Figure 8:
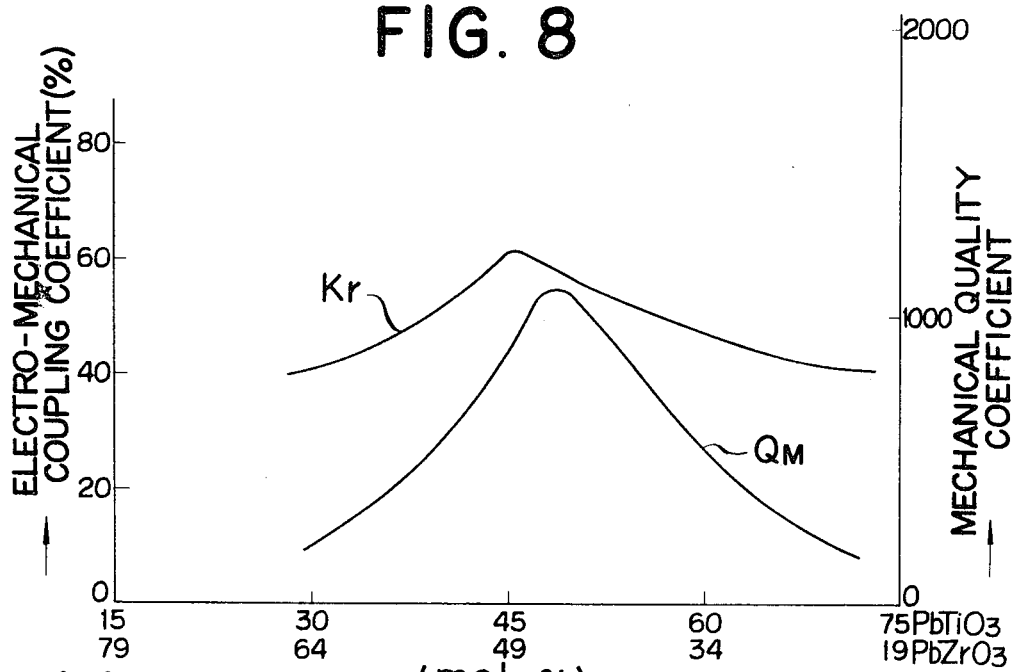
Figure 9:
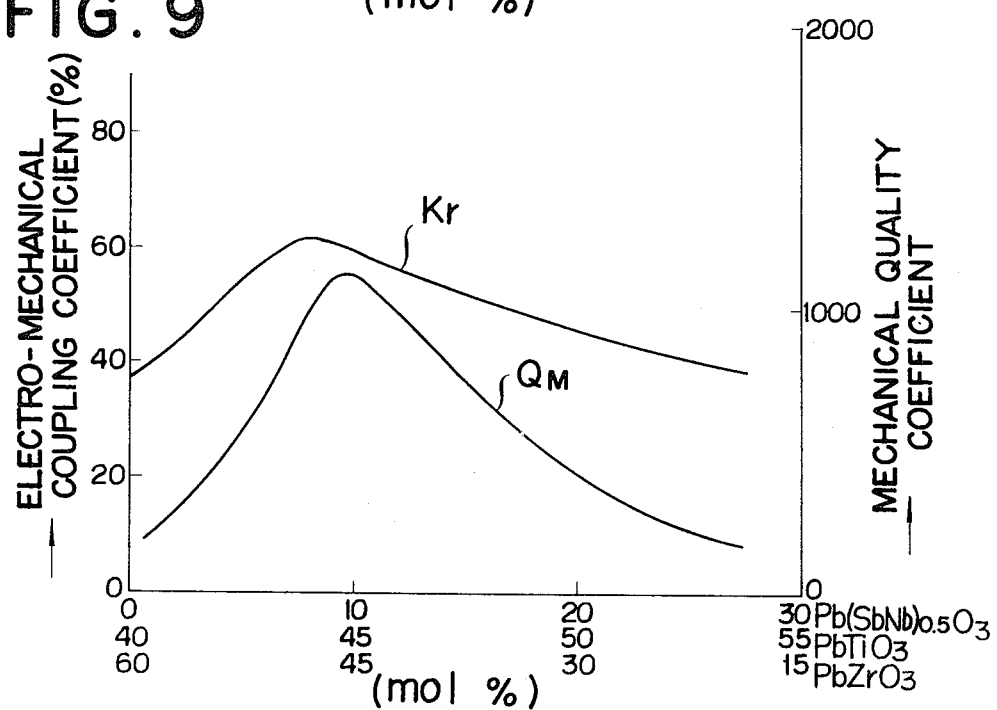
Figure 10:
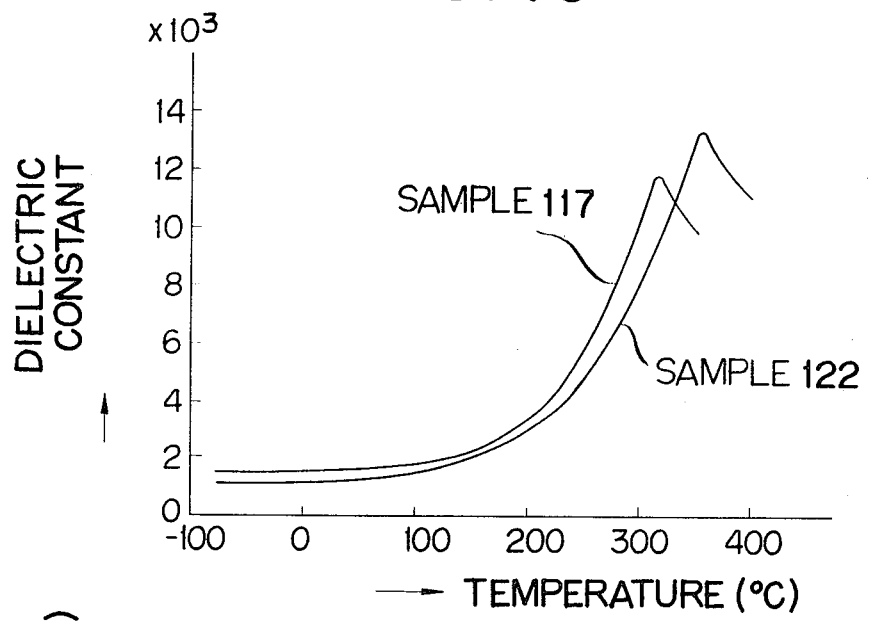
Figure 11:
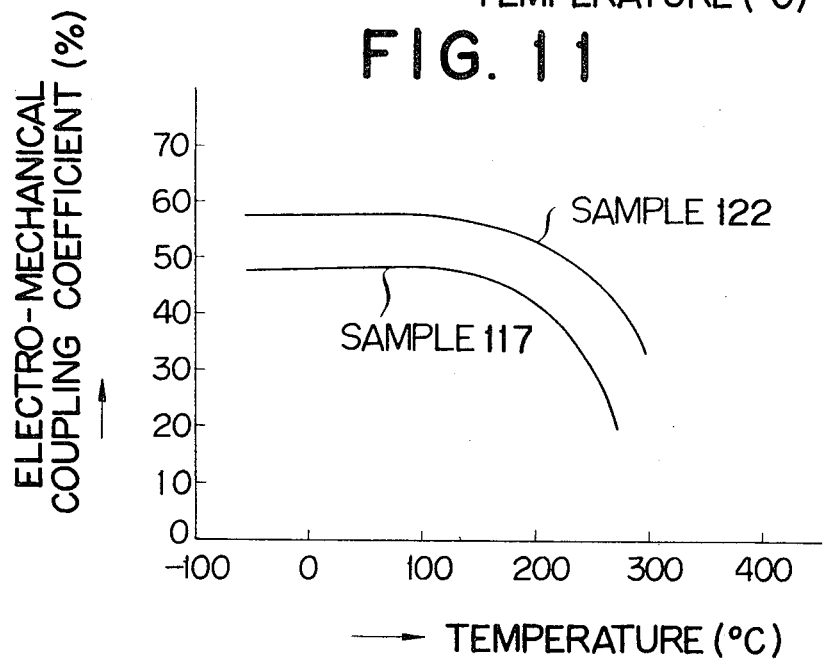
Figure 12:
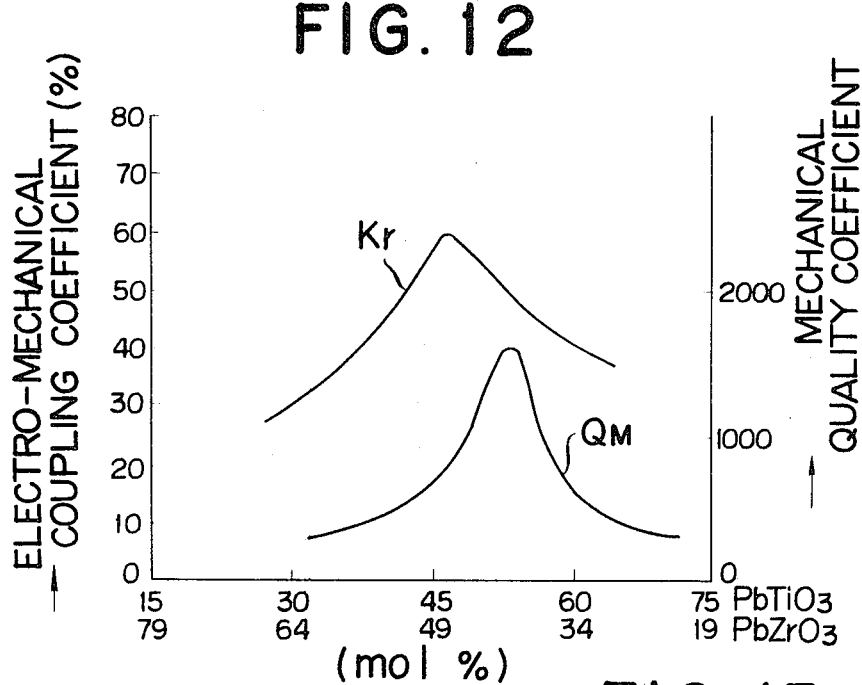
Figure 13:
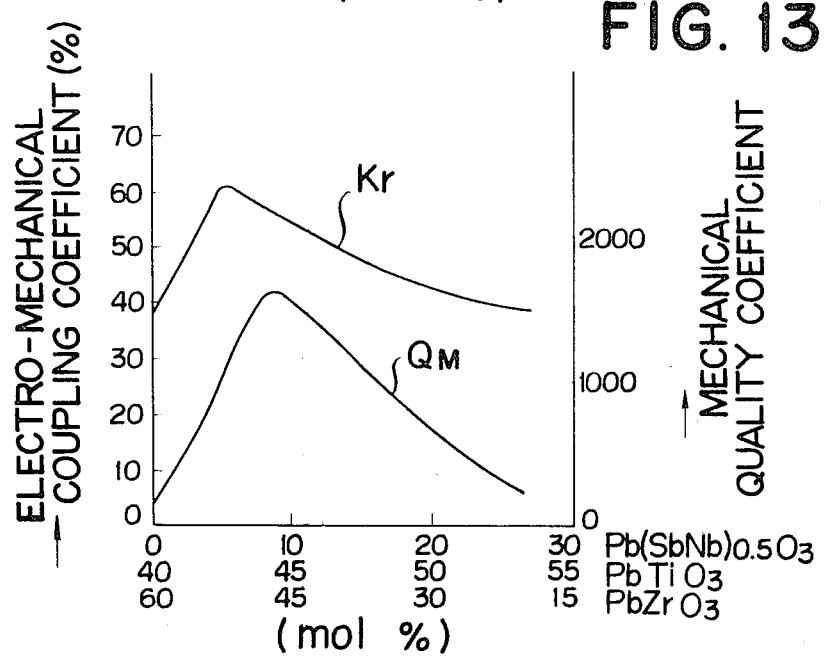
Figure 14:
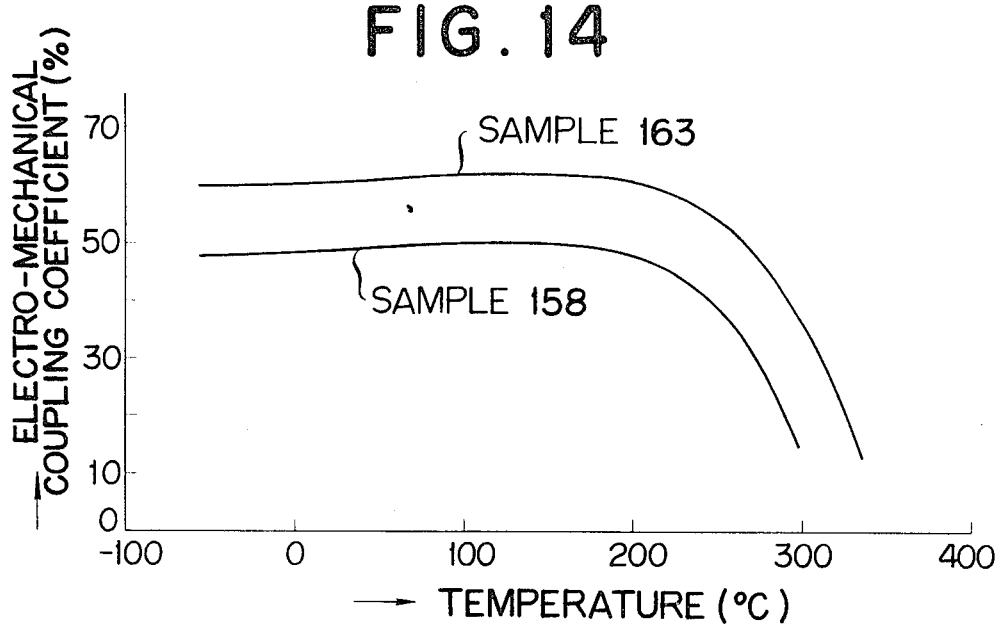
Figure 15:
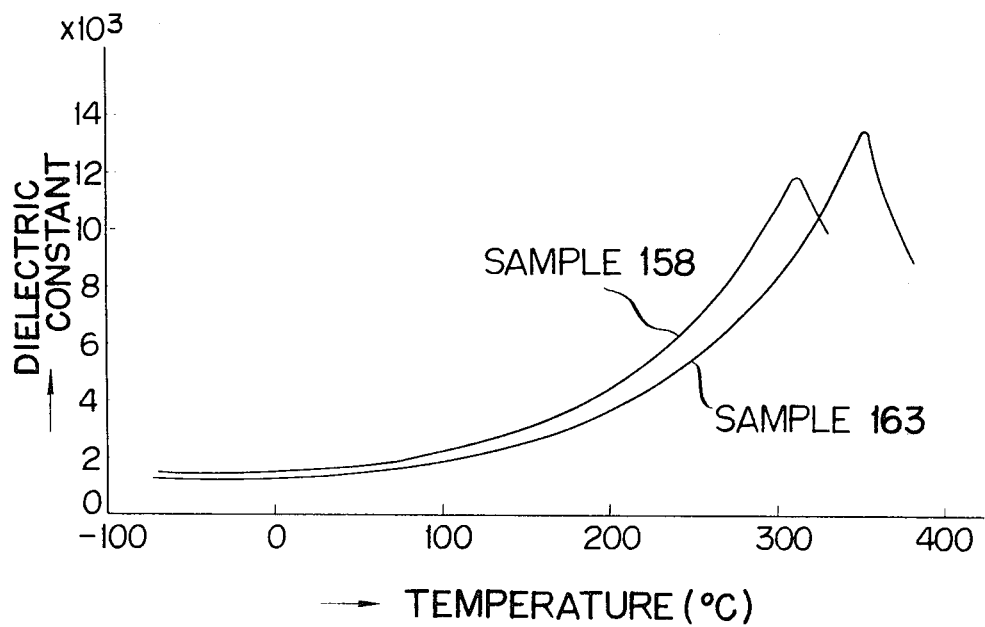
Figure 16:
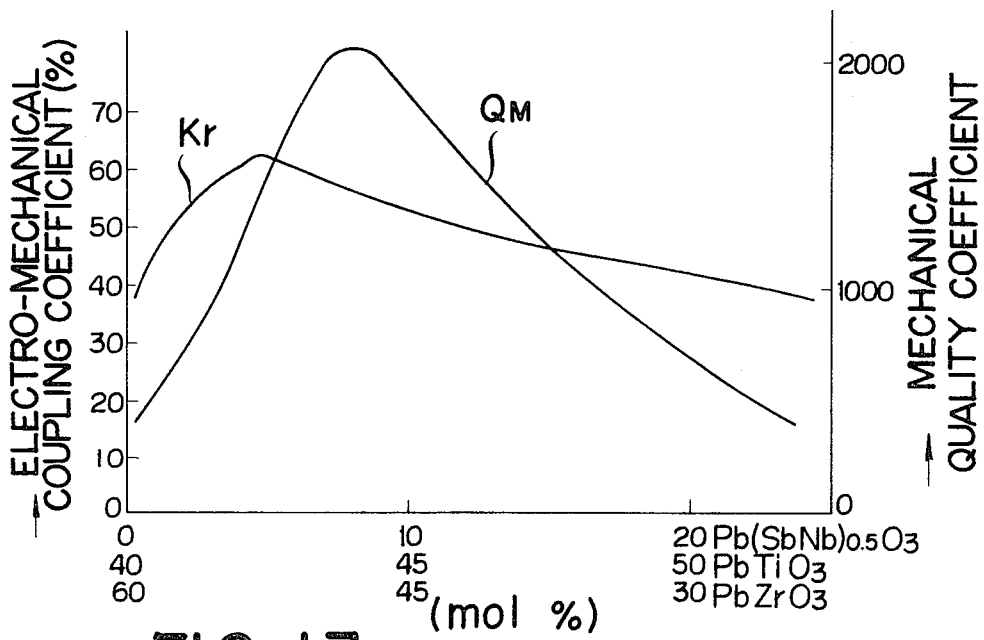
Figure 17:
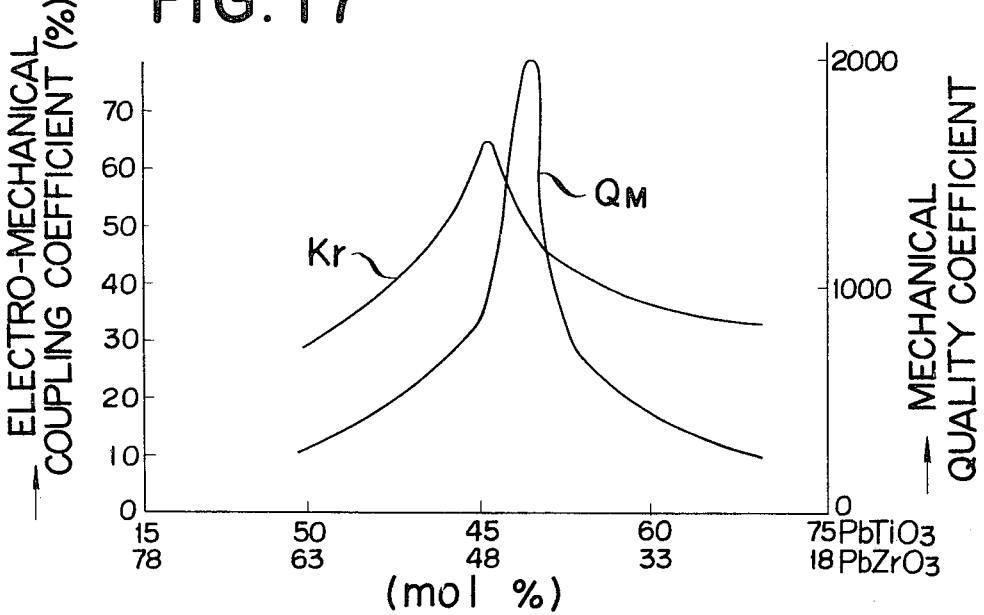

to the piezoelectric properties of the present product as a whole where the proportions of said $ThO_2$ and/or $CeO_2$ are fixed;

FIG. 6 is a curve diagram illustrating the relationship between the dielectric constant of piezoelectric materials prepared according to another embodiment of the invention and ambient temperatures;

FIG. 7 is a curve diagram of the relationship between the piezoelectric properties of said materials and ambient temperatures;

FIG. 8 is a curve diagram showing the relationship of the varied proportions of $PbTiO_3$ and $PbZrO_3$ to the piezoelectric properties of the present product as a whole where the proportions of $NiO$ and/or $CoO$ each forming an auxiliary composition thereof and $Pb(SbNb)_{0.5}O_3$, a component of the basic composition thereof, are fixed;

FIG. 9 is a curve diagram representing the relationship of the varied proportions of $Pb(SbNb)_{0.5}O_3$–$PbTiO_3$–$PbZrO_3$ to the piezoelectric properties of the present product as a whole where the proportions of said $NiO$ and/or $CoO$ are fixed;

FIG. 10 is a curve diagram indicating the relationship of the dielectric constant of piezoelectric materials prepared according to another embodiment of the present invention to ambient temperatures;

FIG. 11 is a curve diagram denoting the relationship of the piezoelectric properties of said materials to ambient temperatures;

FIG. 12 is a curve diagram representing the relationship between the varied proportions of $PbTiO_3$ and $PbZrO_3$ and the piezoelectric properties of the present piezoelectric product as a whole where the proportions of $Cr_2O_3$, one of the auxiliary compositions thereof, and $Pb(SbNb)_{0.5}O_3$, a component of the basic composition thereof, are fixed;

FIG. 13 is a curve diagram illustrating the relationship between the varied proportions of $Pb(SbNb)_{0.5}O_3$–$PbTiO_3$–$PbZrO_3$ and the piezoelectric properties of the present product as a whole where the proportions of said $Cr_2O_3$ are fixed;

FIG. 14 is a curve diagram showing the relationship of the dielectric constant of piezoelectric materials prepared by another embodiment of the present invention to ambient temperatures;

FIG. 15 is a curve diagram denoting the relationship of the piezoelectric properties of said materials to ambient temperatures;

FIG. 16 is a curve diagram indicating the relationship of the varied proportions of $PbTiO_3$ and $PbZrO_3$ to the piezoelectric properties of the present product as a whole where the proportions of $MnO_2$, one of the auxiliary compositions thereof, and $Pb(SbNb)_{0.5}O_3$, a component of the basic composition thereof, are fixed; and FIG. 17 is a curve diagram showing the relationship between the varied proportions of $Pb(SbNb)_{0.5}O_3$–$PbTiO_3$–$PbZrO_3$ and the piezoelectric properties of the present product as a whole where the proportions of said $MnO_2$ are fixed.

As mentioned above, the proportions of $Pb(SbNb)_{0.5}O_3$, a component of the basic composition of piezoelectric oxide materials according to the present invention consisting of $Pb(SbNb)_{0.5}O_3$–$PbTiO_3$–$PbZrO_3$ are suitably selected within the range of 0.5 to 25.0 mol percent on the basis of said basic composition. If the proportions of said $Pb(SbNb)_{0.5}O_3$ exceed 25.0 mol percent the electromechanical coupling coefficient Kr of the piezoelectric product as a whole will fall below the level of about 40% which is required when the product is put to practical applications such as pickup elements, or microphones. And if said proportions decrease from 0.5 mol percent, there will be presented difficulties in the sintering operation to produce compact and mechanically strong piezoelectric materials. Moreover, the resultant product will have too low an electro-mechanical coupling coefficient Kr for satisfactory industrial application.

The proportions of $PbTiO_3$, another component of said basic composition, are suitably selected, as described above, within the range of 36.0 to 55.5 mol percent on the basis of said basic composition. If the content of said $PbTiO_3$ falls outside of this range, it will be impossible to obtain a piezoelectric product whose electro-mechanical coupling coefficient Kr is suffiicently large and less affected by amibent temperatures and long-term use, and in consequence adapted for industrial application as a supersonic wave oscillator.

The proportions of $PbZrO_3$, another component of the aforementioned basic composition, are suitably selected within the range of 3.5 to 20.5 mol percent on the basis of said composition. If the percentage of said $PbZrO_3$ departs from this range the resultant piezoelectric product will not have a large electro-mechanical coupling coefficient Kr and in consequence be reduced in practical value.

Figure 1:
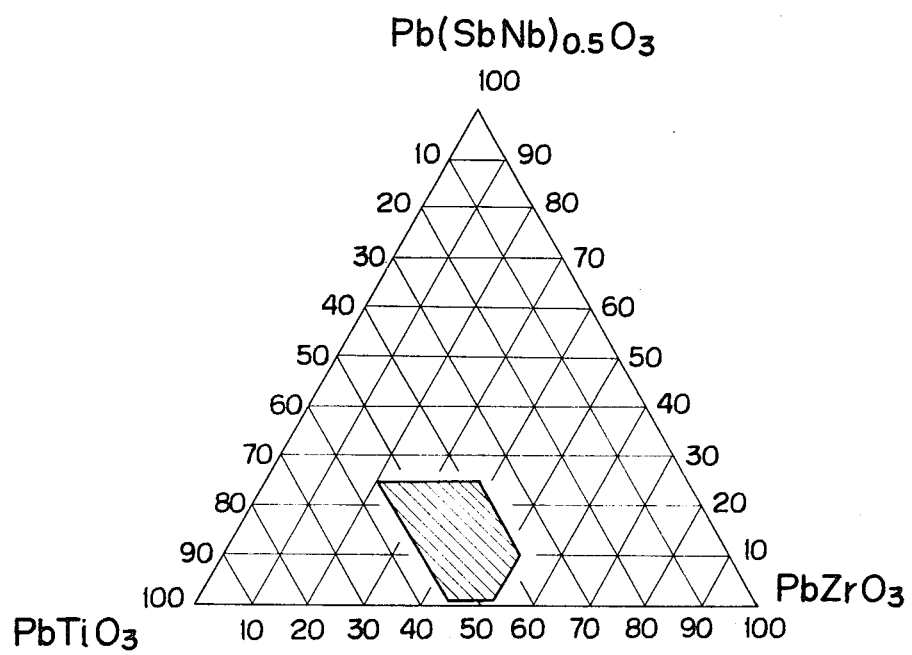
FIG. 1 is a triangular compositional diagram showing the relative proportions of $Pb(SbNb)_{0.5}O_3$–$PbTiO_3$–$PbZrO_3$ constituting a basic composition of piezoelectric oxide materials according to the present invention.

For the foregoing reason, the three components $Pb(SbNb)_{0.5}O_3$, $PbTiO_3$ and $PbZrO_3$ of the basic composition of piezoelectric materials according to the present invention are used in a ratio suitably selected from the range shown in the triangular compositional diagram of FIG. 1.

Further $ThO_2$, $CeO_2$, $NiO_2$, $CoO$, $Cr_2O_3$ and $MnO_2$, added as an auxiliary composition to the aforementioned basic composition act as a sort of mineraliser to facilitate sintering, reduce temperatures required therefor, and suppress the evaporation of PbO constituting part of the basic composition, thereby enabling compact piezoelectric materials to be finally obtained. The added proportions of the auxiliary compositions having such function are separately determined for the reason given below.

$ThO_2$, $CeO_2$ or mixtures thereof are preferably added within the range of 0.1 to 3 percent by weight on the basis of the basic composition. If their proportions exceed 3 percent by weight the resultant piezoelectric product will be conversely reduced in the mechanical quality coefficient $Q_M$. This will lead to decrease in its specific resistance, as a result the occurrence of conduction and shorting while a D.C. voltage is being impressed, and imperfect polarisation, making it impossible to improve said mechanical quality coefficient $Q_M$. If, on the contrary, addition of these auxiliary compositions falls below 0.1 percent by weight, the resultant product will not be much elevated in the mechanical quality coefficient $Q_M$, failing to display the desired excellent piezoelectric properties.

In the case of NiO, CoO or mixture thereof, their addition is preferred to fall within the range of 0.1 to 2.5 percent by weight on the basis of the basic composition. Beyond 2.5 percent by weight, these auixilary compositions will cause the resultant piezoelectric product to decrease in the mechanical quality coefficient $Q_M$ and conversely below 0.1 percent by weight, will not enable the product to be much improved in this respect and exhibit the desired prominent piezoelectric properties.

It is preferred that $Cr_2O_3$ or $MnO_2$ be used within the range of 0.01 to 2 percent by weight on the basis of the basic composition. Their addition in excess of 2 percent by weight will reduce the mechanical quality coefficient $Q_M$ of the resultant piezoelectric product and their proportions of less than 0.01% will not enable the product to have a much improved mechanical quality coefficient $Q_M$ and as a result display the desired high piezoelectric properties.

Piezoelectric oxide materials of the present invention consisting of the aforementioned compositions are prepared by solid solution reaction from a plurality of oxides having different valences. They can be easily fabricated by general powder metallurgical techniques or other known methods. To describe by way of illustration, the prescribed proportions of raw oxide materials, for example, PbO, $TiO_2$, $ZrO_2$, $Sb_2O_3$, $Nb_2O_5$ and auxilary compositions such as $ThO_2$ are exactly weighed out and mixed in a ball mill or the like. The raw materials used in the present invention may of course include other compounds such as hydroxides, carbonates or oxalates which will be converted to oxides by addition of oxygen.

The aforesaid mixture is presintered at relatively low temperatures such as 600 to 900 C., and crushed into mixed powders using a ball mill or the like. Then to these mixed powders is added a binding agent such as water or polyvinyl alcohol. The mass is moulded at a pressure of about 0.5 to 2 ton/cm.² and finally sintered at temperatures of about 1160 to 1280° C. Since part of the PbO is liable to be evaporated and dissipated during this sintering operation, it should preferably be carried out within a sealed furnace. If the mass is maintained 0.5 to 3 hours at predetermined maximum temperature, it will fully serve the purpose. The piezoelectric oxide materials thus prepared can be polarised by disposing on both sides thereof a known means, for example, a pair of electrodes and impressing a D.C. voltage of 20 to 30 kv./cm. for an hour at temperatures of 140 to 160° C.

The piezoelectric oxide material obtained assumes the form of a solid solution in which there are uniformly dispersed PbO, $TiO_2$, $ZrO_2$, $Sb_2O_3$ and $Nb_2O_5$. The X-ray diffractometry disclosed that the mass had a perovskite structure. Expressed by the general formula $ABO_3$, the piezoelectric oxide material consists of a combination of elements having different valences, such as divalent Pb represented by A, and trivalent Sb, pentavalent Nb, tetravalent Ti and Zr denoted by B. Accordingly, the piezoelectric oxide material of the present invention is essentially different from the prior art piezoelectric material which mainly consists of an octahedral oxygen atom, namely, has such a composition which, expressed by the general formula $A'B'O_3$, comprises three types of element combination, i.e, (i) where A' represents a divalent elevalent element and B' a tetravalent element, (ii) where A' denotes a monovalent element and B' a pentavalent element, and (iii) where both A' and B' express equivalent elements.

As mentioned above, the piezoelectric oxide materials according to the present invention not only have a fundamentally different composition from that of the conventional binary or ternary piezoelectric materials such as $PbTiO_3$–$PbZrO_3$ or $PbTiO_3$–$PbZrO_3$–$PbSnO_3$, but also a large electro-mechanical coupling coefficient Kr and an excellent mechanical quality coefficient $Q_M$. Accordingly, the product of the present invention is prominently adapted for use in pickup elements, microphones, oscillographs, or transducers and can be easily manufactured, offering very great advantages in industrial application.

The present invention will be more clearly appreciated from the examples which follow. It will be understood, however, that they are offered only by way of illustration and are not intended to restrict the scope or breadth of the invention or limit the scope of the patent claims appended hereto.

EXAMPLE 1

The prescribed proportions of PbO, $TiO_2$, $ZrO_2$, $Sb_2O_3$ and $NbO_5$ constituting a basic composition, and $ThO_2$, $CeO_2$ or mixtures thereof forming an auxiliary composition were exactly weighed out, with the proportions of $PbTiO_3$ included in said basic composition fixed at 48 mol percent, the proportions of $Pb(SbNb)_{0.5}O_3$ included therein varied to 26, 20, 14, 10, 6 and 0.5 mol percent and the proportions of $PbZrO_3$ similarly included therein varied to 26, 32, 38, 42, 48 and 51.5 mol percent. After being fully mixed in a ball mill, these materials were presintered 1 hour at a temperature of 850° C. and crushed again in a ball mill, obtaining a large number of samples of mixed powders as listed in Table I given later. To each sample was added a binding agent of polyvinyl alcohol, and the mass was moulded at a pressure of 1 ton/cm.² and then finally sintered 1 hour at a maximum temperature of 1210 to 1280° C. in a sealed furnace, obtaining a disk 13 mm. in diameter and 1 mm. thick. Each sintered body was measured for its density D at 23° C., and polarised in a silicon oil at a temperature of 140° C. by fitting a pair of electrodes to both sides thereof and impressing 1 hour in D.C. voltage of 30 kv./cm. across them. The piezoelectric properties of the sintered body were measured using a standard circuit described in "Proceeding of IRE," vol. 137 (1949), pages 1378–1395, vol. 145 (1957), pages 353–358 and vol. 146 (1958), pages 765–778, and also the dielectric constant of said sintered body was determined by customary means. The results of these determinations are presented in Table I below.

TABLE I

| Sample No. | Main composition (mol percent) | | | Auxiliary composition (wt. percent) | F.T. | d. | ε | Kr | QB |
|---|---|---|---|---|---|---|---|---|---|
| | $Pb(SbNb)_{0.5}O_3$ | $PbTiO_3$ | $PbZrO_3$ | | | | | | |
| 1 | 26.0 | 48.0 | 26.0 | 0 | 1,280 | 7.24 | 2,880 | 38.5 | 195 |
| 2 | 26.0 | 48.0 | 26.0 | $ThO_2$ 0.4 | 1,270 | 7.35 | 2,670 | 39.4 | 240 |
| 3 | 26.0 | 48.0 | 26.0 | $ThO_2$ 1.5 | 1,260 | 7.41 | 2,535 | 39.6 | 320 |
| 4 | 26.0 | 48.0 | 26.0 | $CeO_2$ 0.4 | 1,270 | 7.33 | 2,610 | 39.0 | 235 |
| 5 | 26.0 | 48.0 | 26.0 | $CeO_2$ 2.0 | 1,260 | 7.43 | 2,515 | 39.3 | 315 |
| 6 | 20.0 | 48.0 | 32.0 | 0 | 1,280 | 7.28 | 2,705 | 40.2 | 175 |
| 7 | 20.0 | 48.0 | 32.0 | $ThO_2$ 0.2 | 1,270 | 7.38 | 2,640 | 41.5 | 280 |
| 8 | 20.0 | 48.0 | 32.0 | $ThO_2$ 1.5 | 1,250 | 7.43 | 2,580 | 43.6 | 645 |
| 9 | 20.0 | 48.0 | 32.0 | $ThO_2$ 3.0 | 1,230 | 7.39 | 2,490 | 41.1 | 295 |
| 10 | 20.0 | 48.0 | 32.0 | $CeO_2$ 0.2 | 1,270 | 7.36 | 2,625 | 41.3 | 275 |
| 11 | 20.0 | 48.0 | 32.0 | $CeO_2$ 1.5 | 1,250 | 7.42 | 2,570 | 42.9 | 580 |
| 12 | 20.0 | 48.0 | 32.0 | $CeO_2$ 3.0 | 1,230 | 7.34 | 2,475 | 40.8 | 310 |
| 13 | 20.0 | 48.0 | 32.0 | $ThO_2$ 4.0 | 1,230 | 7.30 | 2,430 | 39.5 | 205 |
| 14 | 20.0 | 48.0 | 32.0 | $CeO_2$ 4.0 | 1,230 | 7.34 | 2,500 | 39.2 | 215 |
| 15 | 14.0 | 48.0 | 38.0 | 0 | 1,280 | 7.32 | 1,960 | 42.8 | 150 |
| 16 | 14.0 | 48.0 | 38.0 | $ThO_2$ 0.5 | 1,260 | 7.43 | 1,925 | 44.9 | 480 |
| 17 | 14.0 | 48.0 | 38.0 | $ThO_2$ 1.5 | 1,240 | 7.55 | 1,865 | 46.2 | 685 |
| 18 | 14.0 | 48.0 | 38.0 | $ThO_2$ 2.5 | 1,220 | 7.50 | 1,830 | 42.8 | 280 |
| 19 | 14.0 | 48.0 | 38.0 | $CeO_2$ 0.5 | 1,260 | 7.46 | 1,980 | 45.1 | 510 |
| 20 | 14.0 | 48.0 | 38.0 | $CeO_2$ 1.5 | 1,240 | 7.58 | 2,010 | 47.1 | 730 |
| 21 | 14.0 | 48.0 | 38.0 | $CeO_2$ 2.5 | 1,220 | 7.53 | 1,915 | 43.1 | 425 |
| 22 | 10.0 | 48.0 | 42.0 | 0 | 1,280 | 7.45 | 1,270 | 46.7 | 135 |
| 23 | 10.0 | 48.0 | 42.0 | $ThO_2$ 0.5 | 1,260 | 7.53 | 1,395 | 49.1 | 315 |
| 24 | 10.0 | 48.0 | 42.0 | $ThO_2$ 1.5 | 1,240 | 7.60 | 1,380 | 52.2 | 740 |
| 25 | 10.0 | 48.0 | 42.0 | $ThO_2$ 2.5 | 1,220 | 7.51 | 1,335 | 48.7 | 405 |
| 26 | 10.0 | 48.0 | 42.0 | $CeO_2$ 0.5 | 1,260 | 7.56 | 1,410 | 47.8 | 270 |
| 27 | 10.0 | 48.0 | 42.0 | $CeO_2$ 1.5 | 1,240 | 7.63 | 1,375 | 51.8 | 645 |
| 28 | 10.0 | 48.0 | 42.0 | $CeO_2$ 2.5 | 1,220 | 7.60 | 1,340 | 48.0 | 425 |
| 29 | 6.0 | 48.0 | 46.0 | 0 | 1,280 | 7.43 | 1,210 | 52.3 | 120 |
| 30 | 6.0 | 48.0 | 46.0 | $ThO_2$ 0.5 | 1,260 | 7.54 | 1,305 | 60.4 | 625 |
| 31 | 6.0 | 48.0 | 46.0 | $ThO_2$ 1.5 | 1,240 | 7.58 | 1,275 | 58.6 | 1,620 |
| 32 | 6.0 | 48.0 | 46.0 | $ThO_2$ 2.5 | 1,220 | 7.51 | 1,230 | 55.6 | 705 |
| 33 | 6.0 | 48.0 | 46.0 | $CeO_2$ 0.5 | 1,260 | 7.50 | 1,340 | 59.3 | 740 |
| 34 | 6.0 | 48.0 | 46.0 | $CeO_2$ 1.5 | 1,240 | 7.59 | 1,300 | 60.3 | 1,330 |
| 35 | 6.0 | 48.0 | 46.0 | $CeO_2$ 2.5 | 1,220 | 7.48 | 1,270 | 44.2 | 550 |
| 36 | 0.5 | 48.0 | 51.5 | 0 | 1,280 | 7.38 | 1,060 | 44.2 | 205 |
| 37 | 0.5 | 48.0 | 51.5 | $ThO_2$ 0.5 | 1,260 | 7.48 | 1,170 | 48.8 | 420 |
| 38 | 0.5 | 48.0 | 51.5 | $ThO_2$ 1.5 | 1,240 | 7.52 | 1,200 | 50.4 | 700 |
| 39 | 0.5 | 48.0 | 51.5 | $ThO_2$ 2.5 | 1,220 | 7.46 | 1,135 | 47.7 | 335 |
| 40 | 0.5 | 48.0 | 51.5 | $CeO_2$ 0.5 | 1,260 | 7.50 | 1,195 | 49.5 | 550 |
| 41 | 0.5 | 48.0 | 51.5 | $CeO_2$ 1.5 | 1,240 | 7.61 | 1,160 | 51.3 | 845 |
| 42 | 0.5 | 48.0 | 51.5 | $CeO_2$ 2.5 | 1,220 | 7.44 | 1,125 | 46.8 | 380 |

Throughout Table I above and Tables II, III and IV associated with other examples, F.T. represents a sintering temperature (° C.), d. a density (g./cm.³ at 23° C.), ε a dielectric constant (1 kc./sec. at 23° C.), Kr an electro-mechanical coupling coefficient (percent) and $Q_M$ a mechanical quality coefficient.

Figure 2:
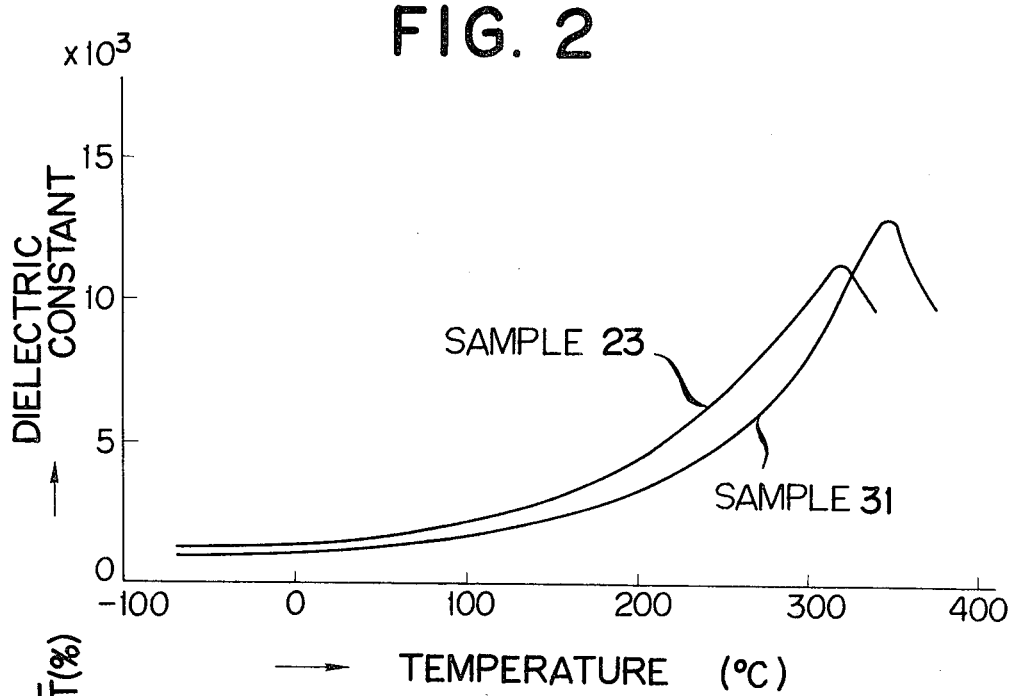
FIG. 2 is a curve diagram representing the relationship between the dielectric constant of piezoelectric materials prepared according to an embodiment of the invention and ambient temperatures.
Figure 3:
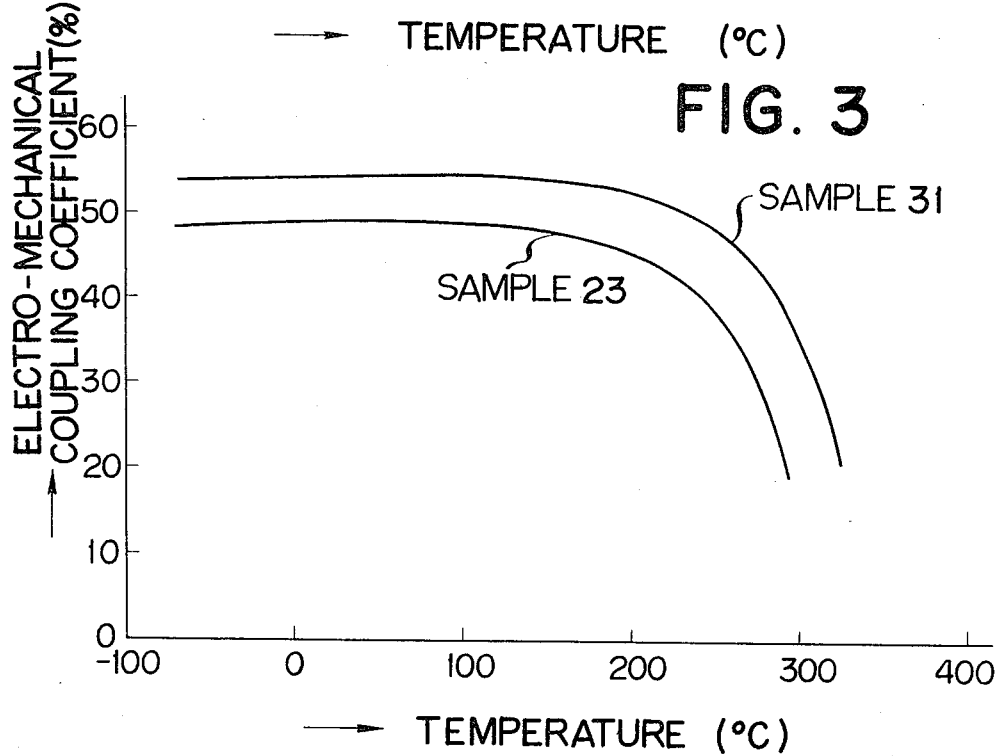
FIG. 3 is a curve diagram indicating the relationship between the piezoelectric properties of said materials and ambient temperatures.

When investigation was made of changes with time in the dielectric constant of samples Nos. 23 and 31 in Table I above, there were obtained the results shown in FIG. 2. The Curie points of both samples presented values as high as 320 and 350° C. The temperature characteristics of the electro-mechanical coupling coefficient Kr of these piezo-electric samples were also determined and the results are presented in FIG. 3. The high Curie points of said samples reduced the range of changes with temperature in their electro-mechanical coupling coefficient Kr over a temperature range of −60 to 200° C., proving that a fully high electro-mechanical coupling coefficient Kr could be utilised under a stable condition.

EXAMPLE 2

Figure 4:
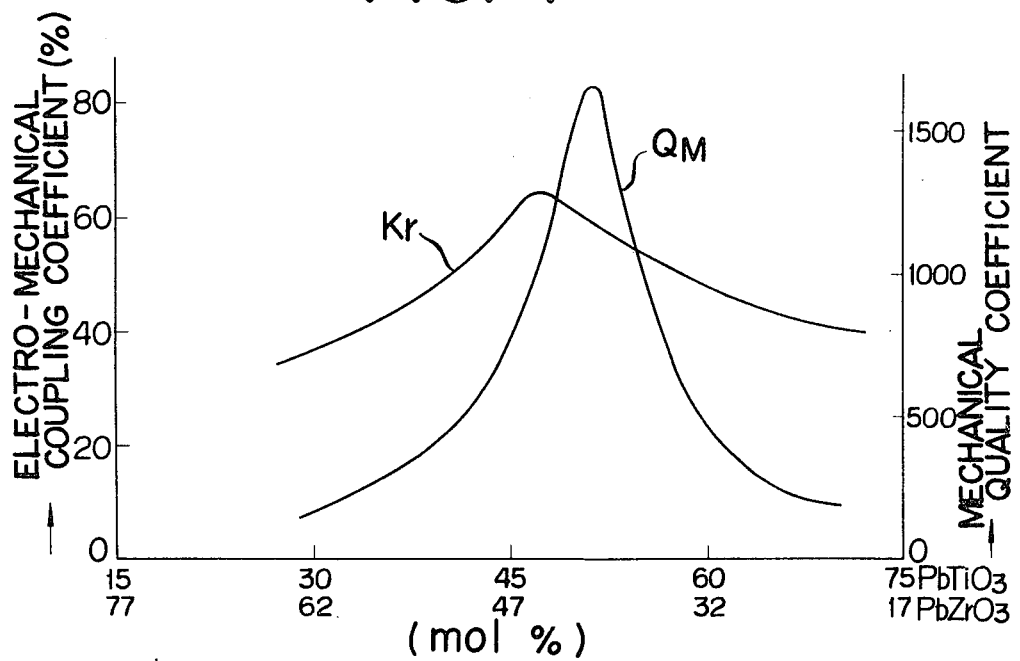
FIG. 4 is a curve diagram showing the relationship of the varied proportions of $PbTiO_3$ and $PbZrO_3$ to the piezoelectric properties of the present product as a whole where the proportions of $ThO_2$ and/or $CeO_2$ each forming an auxiliary composition thereof and $Pb(SbNb)_{0.5}O_3$, a component of the basic composition thereof, are fixed.

There were prepared various combination of raw materials with addition of $ThO_2$ fixed at 1.0 percent by weight, the proportions of $Pb(SbNb)_{0.5}O_3$ also fixed at 8.0 mol percent, and the proportions of $PbTiO_3$ and PbZrO₃ varied in turn. All these mixtures were processed in substantially the same manner as in Example 1, obtaining many kinds of piezoelectric samples. Determination was made of the relationship of piezoelectric properties versus composition of each sample, the results being presented in FIG. 4.

ample 1, obtaining a sintered disk 13 mm. in diameter and 1 mm. thick. The sintered body was measured for its density (d) and polarised in the same manner as in Example 1. Determination was also made of the piezoelectric properties and dielectric constant of the sintered body, the results being presented in Table II below.

TABLE II

| Sample No. | Main composition (mol percent) | | | Auxiliary composition (wt. percent) | F.T. | d. | ε | Piezoelectric properties | |
|---|---|---|---|---|---|---|---|---|---|
| | $Pb(SbNb)_{0.5}O_3$ | $PbTiO_3$ | $PbZrO_3$ | | | | | $Kr$ | $Q_M$ |
| 51 | 26.0 | 48.0 | 26.0 | 0 | 1,280 | 7.23 | 2,880 | 38.4 | 195 |
| 52 | 26.0 | 48.0 | 26.0 | CoO 0.4 | 1,270 | 7.34 | 2,655 | 39.2 | 240 |
| 53 | 26.0 | 48.0 | 26.0 | CoO 1.5 | 1,260 | 7.40 | 2,590 | 39.5 | 290 |
| 54 | 20.0 | 48.0 | 32.0 | 0 | 1,280 | 7.26 | 2,700 | 40.3 | 175 |
| 55 | 20.0 | 48.0 | 32.0 | CoO 0.2 | 1,270 | 7.38 | 2,680 | 41.5 | 280 |
| 56 | 20.0 | 48.0 | 32.0 | CoO 1.0 | 1,260 | 7.41 | 2,650 | 42.4 | 435 |
| 57 | 20.0 | 48.0 | 32.0 | CoO 1.5 | 1,250 | 7.44 | 2,585 | 41.8 | 370 |
| 58 | 20.0 | 48.0 | 32.0 | CoO 2.0 | 1,250 | 7.39 | 2,575 | 41.3 | 280 |
| 59 | 20.0 | 48.0 | 32.0 | CoO 2.5 | 1,250 | 7.37 | 2,540 | 40.8 | 205 |
| 60 | 20.0 | 48.0 | 32.0 | NiO 0.2 | 1,270 | 7.36 | 2,660 | 40.8 | 295 |
| 61 | 20.0 | 48.0 | 32.0 | NiO 1.0 | 1,260 | 7.40 | 2,645 | 42.2 | 405 |
| 62 | 20.0 | 48.0 | 32.0 | NiO 1.5 | 1,250 | 7.46 | 2,595 | 41.7 | 325 |
| 63 | 20.0 | 48.0 | 32.0 | NiO 2.0 | 1,250 | 7.43 | 2,560 | 41.1 | 290 |
| 64 | 20.0 | 48.0 | 32.0 | NiO 2.5 | 1,250 | 7.41 | 2,570 | 40.8 | 190 |
| 65 | 20.0 | 48.0 | 32.0 | NiO 3.0 | 1,250 | 7.35 | 2,525 | 40.0 | 160 |
| 66 | 14.0 | 48.0 | 38.0 | 0 | 1,280 | 7.28 | 1,950 | 42.8 | 150 |
| 67 | 14.0 | 48.0 | 38.0 | CoO 0.3 | 1,270 | 7.38 | 1,970 | 44.6 | 365 |
| 68 | 14.0 | 48.0 | 38.0 | CoO 1.0 | 1,250 | 7.50 | 2,000 | 44.9 | 400 |
| 69 | 14.0 | 48.0 | 38.0 | CoO 1.5 | 1,240 | 7.46 | 1,945 | 43.8 | 310 |
| 70 | 14.0 | 48.0 | 38.0 | CoO 2.0 | 1,240 | 7.44 | 1,920 | 42.9 | 285 |
| 71 | 14.0 | 48.0 | 38.0 | NiO 0.3 | 1,270 | 7.39 | 1,985 | 43.7 | 270 |
| 72 | 14.0 | 48.0 | 38.0 | NiO 1.0 | 1,250 | 7.51 | 2,005 | 45.1 | 455 |
| 73 | 14.0 | 48.0 | 38.0 | NiO 1.5 | 1,240 | 7.50 | 1,970 | 44.4 | 350 |
| 74 | 14.0 | 48.0 | 38.0 | NiO 2.0 | 1,240 | 7.43 | 1,945 | 43.0 | 215 |
| 75 | 10.0 | 48.0 | 42.0 | 0 | 1,280 | 7.46 | 1,275 | 46.8 | 135 |
| 76 | 10.0 | 48.0 | 42.0 | CoO 0.5 | 1,260 | 7.54 | 1,390 | 48.1 | 320 |
| 77 | 10.0 | 48.0 | 42.0 | CoO 1.0 | 1,240 | 7.56 | 1,385 | 49.2 | 660 |
| 78 | 10.0 | 48.0 | 42.0 | CoO 2.0 | 1,230 | 7.50 | 1,360 | 47.7 | 300 |
| 79 | 10.0 | 48.0 | 42.0 | NiO 0.5 | 1,260 | 7.53 | 1,345 | 47.6 | 290 |
| 80 | 10.0 | 48.0 | 42.0 | NiO 1.0 | 1,240 | 7.58 | 1,370 | 48.8 | 740 |
| 81 | 10.0 | 48.0 | 42.0 | NiO 2.0 | 1,230 | 7.51 | 1,305 | 47.0 | 295 |
| 82 | 5.0 | 48.0 | 47.0 | 0 | 1,270 | 7.38 | 1,180 | 51.6 | 260 |
| 83 | 5.0 | 48.0 | 47.0 | CoO 0.5 | 1,260 | 7.60 | 1,200 | 57.6 | 350 |
| 84 | 5.0 | 48.0 | 47.0 | CoO 1.0 | 1,240 | 7.65 | 1,240 | 59.1 | 955 |
| 85 | 5.0 | 48.0 | 47.0 | CoO 1.5 | 1,230 | 7.61 | 1,225 | 58.0 | 1,050 |
| 86 | 5.0 | 48.0 | 47.0 | CoO 2.0 | 1,210 | 7.56 | 1,210 | 54.4 | 495 |
| 87 | 5.0 | 48.0 | 47.0 | NiO 0.5 | 1,260 | 7.63 | 1,205 | 53.3 | 410 |
| 88 | 5.0 | 48.0 | 47.0 | NiO 1.0 | 1,240 | 7.70 | 1,290 | 61.4 | 870 |
| 89 | 5.0 | 48.0 | 47.0 | NiO 1.5 | 1,230 | 7.66 | 1,260 | 58.8 | 915 |
| 90 | 5.0 | 48.0 | 47.0 | NiO 2.0 | 1,220 | 7.53 | 1,250 | 54.6 | 395 |
| 91 | 0.5 | 48.0 | 51.5 | 0 | 1,270 | 7.37 | 1,040 | 42.6 | 205 |
| 92 | 0.5 | 48.0 | 51.5 | CoO 0.5 | 1,260 | 7.45 | 1,105 | 44.1 | 270 |
| 93 | 0.5 | 48.0 | 51.5 | CoO 1.0 | 1,240 | 7.56 | 1,180 | 45.2 | 630 |
| 94 | 0.5 | 48.0 | 51.5 | CoO 2.0 | 1,230 | 7.53 | 1,145 | 44.0 | 410 |
| 95 | 0.5 | 48.0 | 51.5 | NiO 0.5 | 1,260 | 7.47 | 1,110 | 44.8 | 290 |
| 96 | 0.5 | 48.0 | 51.5 | NiO 1.0 | 1,240 | 7.59 | 1,195 | 46.0 | 710 |
| 97 | 0.5 | 48.0 | 51.5 | NiO 2.0 | 1,230 | 7.50 | 1,160 | 45.3 | 455 |
| 98 | 0.5 | 48.0 | 51.5 | NiO 3.0 | 1,230 | 7.52 | 1,130 | 41.8 | 195 |

EXAMPLE 3

Figure 5:
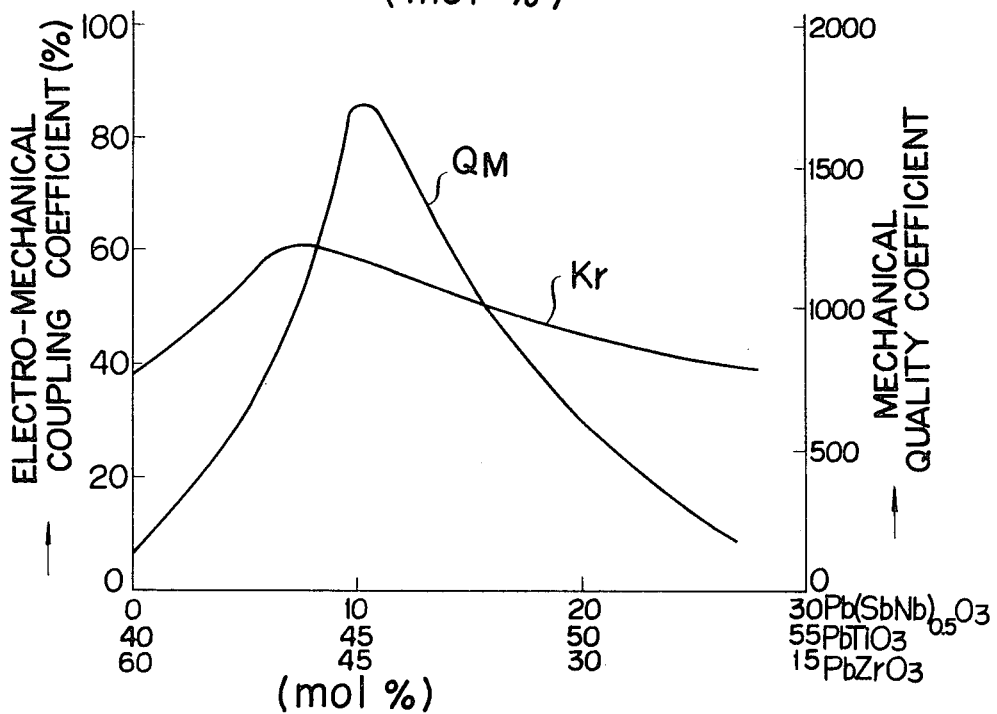

There were prepared various combinations of raw materials with addition of $CeO_2$ fixed at 1.3 percent by weight and the proportions of $Pb(SbNb)_{0.5}O_3$, $PbTiO_3$ and $PbZrO_3$ varied. All these mixtures were processed in substantially the same manner as in Example 1 to prepare many kinds of piezoelectric samples. Determination was made of the relationship of piezoelectric properties versus composition of each sample, the results being indicated in FIG. 5.

EXAMPLE 4

There were weighed out the prescribed proportions of PbO, $TiO_2$, $ZrO_2$, $SbO_3$, $Sb_2O_3$, $Nb_2O_5$, NiO and CoO with the proportions of $PbTiO_3$, a component of the basic composition, fixed at 48 mol percent, the proportions of $Pb(SbNb)_{0.5}O_3$ involved in said basic composition varied to 26, 20, 14, 10, 5 and 0.5 mol percent and the proportions of $PbZrO_3$, another component of said basic composition, varied to 26, 32, 38, 42, 47 and 51.5 mol percent, and the proportions of NiO, CoO or mixtures thereof set at 0 to 3 percent by weight on the basis of said basic composition. After being fully mixed in a ball mill, these materials were presintered at a temperature of 850° C. They were again crushed in a ball mill, obtaining a large number of samples of mixed powders as listed in Table I. To each sample was added polyvinyl alcohol and the mass was processed in the same manner as in Example 1, obtaining a sintered disk 13 mm. in diameter and 1 mm. thick.

When determination was made of changes with temperature in the dielectric constant of samples Nos. 84 and 96 in Table II above, there were observed the tendencies shown in FIG. 6. The sample displayed high Curie points as 320 and 360° C.

The temperature characteristics of the electro-mechanical coupling coefficient Kr of said samples were also determined obtaining the results shown in FIG. 7. Their high Curie points reduced the range of changes with time in the electro-mechanical coupling coefficient Kr over a temperature range of —60 to 200° C., proving that a fully high electro-mechanical coupling coefficient Kr could be utilised under a stable condition.

EXAMPLE 5

There were prepared various combinations of raw materials, with addition of $ThO_2$ fixed at 1.1 percent by weight, the proportions of $Pb(SbNb)_{0.5}O_3$ also fixed at 6.0 mol percent and the proportions of $PbTiO_3$ and $PbZrO_3$ varied in turn. Each sample was processed in substantially the same way as in Example 1 to obtain a piezoelectric material. The relationship of piezoelectric properties versus composition of the sample was determined, the results being presented in FIG. 8.

EXAMPLE 6

There were prepared various combinations of raw materials with addition of CoO fixed to 0.8 percent by weight on the basis of the basic composition and the proportions of $Pb(SbNb)_{0.5}O_3$, $PbTiO_3$ and $PbZrO_3$ varied. Each sample was processed in substantially the same manner as in Example 1 to prepare a piezoelectric material. Determination was made of the relationship of piezoelectric properties versus composition of the sample, the results being given in FIG. 9.

EXAMPLE 7

There were exactly weighed out the prescribed proportions of PbO, $ZrO_2$, $Sb_2O_3$ and $Nb_2O_5$ constituting the basic composition and $Cr_2O_3$ as an auxiliary composition, with the proportions of $PbTiO_3$, a component of the basic composition, fixed at 49 mol percent, the proportions of $Pb(SbNb)_{0.5}O_3$ varied to 26, 20, 14, 10, 4 and 0.5 mol percent, the proportions of $PbZrO_3$ varied to 26, 32, 38, 42, 48 and 51.5 mol percent, and the proportions of $Cr_2O_3$ as an auxiliary composition varied to 0 to 2 percent by weight. After being fully mixed in a ball mill, these materials were presintered 1 hour at a temperature of 850° C. They were again crushed in a ball mill, obtaining a large number of samples of mixed powders listed in Table III given later. To each sample was added polyvinyl alcohol and the mass was processed in the same way as in Example 1, obtaining a sintered disk 13 mm. in diameter and 1 mm. thick. The sample was determined for its density (d.) and polarised in the same manner as in Example 1. Determination was made of the piezoelectric properties and dielectric constant of the sample, the results being given in Table III below.

EXAMPLE 8

There were prepared various combinations of raw materials with addition of $Cr_2O_3$ fixed at 0.5 percent by weight, the proportions of $Pb(SnNb)_{0.5}O_3$ also fixed at 6.0 mol percent and the proportions of $PbTiO_3$ and $PbZrO_3$ varied in turn, obtaining a large number of samples of mixed powders. Each sample was processed in substantially the same manner as in Example 1 to form a piezoelectric material. Determination was made of the relationship of piezoelectric properties versus composition of the sample, the results being given in FIG. 12.

EXAMPLE 9

There were prepared various compositions of raw materials with addition of $Cr_2O_3$ fixed at 0.5 percent by weight on the basis of the basic composition, and the proportions of $Pb(SbNb)_{0.5}O_3$, $PbTiO_3$, and $PbZrO_3$ varied. Each sample was processed in substantially the manner as in Example 1 to prepare a piezoelectric material. Determination was made of the relationship of piezoelectric properties versus composition of the sample, the results being given in FIG. 13.

EXAMPLE 10

There were exactly weighed out the prescribed proportions of PbO, $TiO_2$, $ZrO_2$, $Sb_2O_3$, $Nb_2O_3$ constituting the basic composition and $MnO_2$ as an auxiliary composition, with the proportions of $PbTiO_3$, a component of the basic composition, fixed at 48 mol percent, the propor-

TABLE III

| Sample No. | Main composition (mol percent) | | | Addition of $Cr_2O_3$ wt. percent | F.T. | d. | ε | Piezoelectric properties | |
|---|---|---|---|---|---|---|---|---|---|
| | $Pb(SbNb)_{0.5}O_3$ | $PbTiO_3$ | $PbZrO_3$ | | | | | Kr | $Q_m$ |
| 100 | 26.0 | 48.0 | 26.0 | 0 | 1,280 | 7.25 | 2,880 | 38.5 | 195 |
| 101 | 26.0 | 48.0 | 26.0 | 0.4 | 1,270 | 7.36 | 2,665 | 39.0 | 240 |
| 102 | 26.0 | 48.0 | 26.0 | 1.1 | 1,260 | 7.41 | 2,585 | 39.6 | 330 |
| 103 | 20.0 | 48.0 | 32.0 | 0 | 1,280 | 7.28 | 2,705 | 40.2 | 175 |
| 104 | 20.0 | 48.0 | 32.0 | 0.2 | 1,270 | 7.38 | 2,660 | 41.3 | 280 |
| 105 | 20.0 | 48.0 | 32.0 | 1.0 | 1,260 | 7.41 | 2,645 | 42.4 | 670 |
| 106 | 20.0 | 48.0 | 32.0 | 1.5 | 1,250 | 7.43 | 2,590 | 41.6 | 565 |
| 107 | 20.0 | 48.0 | 32.0 | 2.0 | 1,250 | 7.37 | 2,535 | 41.3 | 280 |
| 108 | 20.0 | 48.0 | 32.0 | 3.0 | 1,230 | 7.35 | 2,480 | 39.6 | 175 |
| 109 | 14.0 | 48.0 | 38.0 | 0 | 1,280 | 7.22 | 1,950 | 42.8 | 150 |
| 110 | 14.0 | 48.0 | 38.0 | 0.01 | 1,270 | 7.29 | 1,965 | 44.6 | 225 |
| 111 | 14.0 | 48.0 | 38.0 | 0.3 | 1,270 | 7.48 | 1,970 | 44.8 | 480 |
| 112 | 14.0 | 48.0 | 38.0 | 1.0 | 1,250 | 7.52 | 1,855 | 43.9 | 635 |
| 113 | 14.0 | 48.0 | 38.0 | 1.5 | 1,240 | 7.53 | 1,840 | 43.0 | 365 |
| 114 | 14.0 | 48.0 | 38.0 | 2.0 | 1,230 | 7.50 | 1,825 | 42.8 | 210 |
| 115 | 10.0 | 48.0 | 42.0 | 0 | 1,280 | 7.46 | 1,275 | 46.8 | 135 |
| 116 | 10.0 | 48.0 | 42.0 | 0.1 | 1,270 | 7.53 | 1,390 | 47.2 | 320 |
| 117 | 10.0 | 48.0 | 42.0 | 0.5 | 1,260 | 7.54 | 1,410 | 47.6 | 890 |
| 118 | 10.0 | 48.0 | 42.0 | 1.0 | 1,240 | 7.60 | 1,380 | 46.5 | 650 |
| 119 | 10.0 | 48.0 | 42.0 | 1.5 | 1,230 | 7.62 | 1,335 | 45.9 | 395 |
| 120 | 10.0 | 48.0 | 42.0 | 2.0 | 1,230 | 7.58 | 1,310 | 45.2 | 260 |
| 121 | 4.0 | 48.0 | 48.0 | 0 | 1,270 | 7.38 | 1,180 | 51.6 | 120 |
| 122 | 4.0 | 48.0 | 48.0 | 0.01 | 1,270 | 7.43 | 1,230 | 57.2 | 335 |
| 123 | 4.0 | 48.0 | 48.0 | 0.5 | 1,260 | 7.54 | 1,305 | 60.4 | 585 |
| 124 | 4.0 | 48.0 | 48.0 | 1.0 | 1,240 | 7.58 | 1,275 | 59.1 | 1,580 |
| 125 | 4.0 | 48.0 | 48.0 | 1.5 | 1,230 | 7.51 | 1,225 | 55.3 | 720 |
| 126 | 4.0 | 48.0 | 48.0 | 2.0 | 1,220 | 7.49 | 1,210 | 50.8 | 265 |
| 127 | 0.5 | 48.0 | 51.5 | 0 | 1,270 | 7.37 | 1,040 | 42.6 | 205 |
| 128 | 0.5 | 48.0 | 51.5 | 0.2 | 1,270 | 7.46 | 1,105 | 43.8 | 417 |
| 129 | 0.5 | 48.0 | 51.5 | 0.5 | 1,260 | 7.52 | 1,195 | 44.1 | 620 |
| 130 | 0.5 | 48.0 | 51.5 | 1.0 | 1,240 | 7.57 | 1,260 | 43.1 | 485 |
| 131 | 0.5 | 48.0 | 51.5 | 2.0 | 1,220 | 7.53 | 1,145 | 41.9 | 295 |
| 132 | 0.5 | 48.0 | 51.5 | 3.0 | 1,220 | 7.50 | 1,080 | 39.6 | 190 |

When determination was made of changes with temperature in the dielectric constant of samples Nos. 117 and 122, there were observed the tendencies shown in FIG. 10. The samples had as high Curie points as 315 and 345° C. The temperature characteristics of the electro-mechanical coupling coefficient Kr of the samples were determined, obtaining the results given in FIG. 11. Also in this case, their high Curie points reduced the range of changes with temperature in their electro-mechanical coupling coefficient Kr over a temperature range of −60 to 200° C., proving that a fully high electro-mechanical coupling coefficient Kr could be utilised under a stable condition.

tions of $Pb(SbNb)_{0.5}O_3$, another component of the basic composition, varied to 26, 20, 15, 10, 5 and 0.5 mol percent, the proportions of $PbZrO_3$, also another composition of the basic composition, varied to 26, 32, 37, 42, 47 and 51.5 mol percent, and the proportions of $MnO_2$ as an auxiliary composition varied to 0 to 3 percent by weight. After being fully mixed in a ball mill, these materials were presintered at a temperature of 600 to 900° C. They were again crushed in a ball mill, obtaining a large number of samples of mixed powders listed in Table IV given later. To each sample was added polyvinyl alcohol and the mass was processed in the same manner as in Example 1, obtaining a sintered disk 13 mm. in diameter and 1 mm.

thick. The sintered body was determined for its density (d) and polarised in the same manner as in Example 1. The piezoelectric properties and dielectric constant of the sample were determined in the same way as in Example 1, the results being presented in Table IV below.

Each sample was processed in substantially the same way as in Example 1 to prepare a piezoelectric material. Determination was made of the relationship of piezoelectric properties versus composition of the sample, the results being presented in FIG. 17.

TABLE IV

| Sample No. | Main Composition (mol percent) | | | Addition of MnO₂, wt. percent | F.T. | d. | ε | Piezoelectric properties | |
|---|---|---|---|---|---|---|---|---|---|
| | Pb(SbNb)₀.₅O₃ | PbTiO₃ | PbZrO₃ | | | | | Kr | QM |
| 141 | 26.0 | 48.0 | 26.0 | 0 | 1,260 | 7.23 | 2,873 | 39.5 | 20 |
| 142 | 26.0 | 48.0 | 26.0 | 0.5 | 1,260 | 7.38 | 2,632 | 39.0 | 250 |
| 143 | 26.0 | 48.0 | 26.0 | 1.0 | 1,250 | 7.40 | 2,545 | 38.5 | 340 |
| 144 | 20.0 | 48.0 | 32.0 | 0 | 1,260 | 7.31 | 2,703 | 41.6 | 195 |
| 145 | 20.0 | 48.0 | 32.0 | 0.2 | 1,260 | 7.35 | 2,735 | 41.8 | 280 |
| 146 | 20.0 | 48.0 | 32.0 | 1.0 | 1,260 | 7.39 | 2,716 | 42.1 | 840 |
| 147 | 20.0 | 48.0 | 32.0 | 1.5 | 1,250 | 7.42 | 2,683 | 41.6 | 730 |
| 148 | 20.0 | 48.0 | 32.0 | 2.0 | 1,240 | 7.39 | 2,530 | 41.2 | 280 |
| 149 | 20.0 | 48.0 | 32.0 | 3.0 | 1,220 | 7.40 | 2,465 | 39.8 | 180 |
| 150 | 15.0 | 48.0 | 37.0 | 0 | 1,260 | 7.46 | 2,037 | 43.2 | 165 |
| 151 | 15.0 | 48.0 | 37.0 | 0.01 | 1,260 | 7.48 | 1,980 | 44.0 | 310 |
| 152 | 15.0 | 48.0 | 37.0 | 0.3 | 1,250 | 7.52 | 1,841 | 43.6 | 750 |
| 153 | 15.0 | 48.0 | 37.0 | 1.0 | 1,240 | 7.51 | 1,880 | 42.5 | 670 |
| 154 | 15.0 | 48.0 | 37.0 | 1.5 | 1,230 | 7.56 | 1,793 | 41.3 | 365 |
| 155 | 15.0 | 48.0 | 37.0 | 2.0 | 1,220 | 7.53 | 1,692 | 41.8 | 205 |
| 156 | 10.0 | 48.0 | 42.0 | 0 | 1,260 | 7.51 | 1,351 | 46.7 | 135 |
| 157 | 10.0 | 48.0 | 42.0 | 0.1 | 1,260 | 7.55 | 1,363 | 47.1 | 330 |
| 158 | 10.0 | 48.0 | 42.0 | 0.5 | 1,240 | 7.52 | 1,340 | 47.8 | 1,340 |
| 159 | 10.0 | 48.0 | 42.0 | 1.0 | 1,230 | 7.60 | 1,221 | 46.5 | 760 |
| 160 | 10.0 | 48.0 | 42.0 | 1.5 | 1,230 | 7.63 | 1,183 | 45.1 | 390 |
| 161 | 10.0 | 48.0 | 42.0 | 2.0 | 1,210 | 7.59 | 1,105 | 44.8 | 200 |
| 162 | 5.0 | 48.0 | 47.0 | 0 | 1,250 | 7.50 | 1,190 | 53.2 | 115 |
| 163 | 5.0 | 48.0 | 47.0 | 0.01 | 1,250 | 7.53 | 1,187 | 60.3 | 535 |
| 164 | 5.0 | 48.0 | 47.0 | 0.5 | 1,230 | 7.58 | 1,095 | 56.7 | 2,105 |
| 165 | 5.0 | 48.0 | 47.0 | 1.0 | 1,220 | 7.60 | 1,071 | 55.3 | 1,320 |
| 166 | 5.0 | 48.0 | 47.0 | 1.5 | 1,210 | 7.55 | 960 | 51.7 | 720 |
| 167 | 5.0 | 48.0 | 47.0 | 2.0 | 1,210 | 7.49 | 930 | 50.6 | 280 |
| 168 | 0.5 | 48.0 | 51.5 | 0 | 1,260 | 7.49 | 1,010 | 42.5 | 210 |
| 169 | 0.5 | 48.0 | 51.5 | 0.2 | 1,260 | 7.53 | 1,005 | 43.6 | 415 |
| 170 | 0.5 | 48.0 | 51.5 | 0.5 | 1,250 | 7.51 | 973 | 42.9 | 630 |
| 171 | 0.5 | 48.0 | 51.5 | 1.0 | 1,230 | 7.52 | 960 | 41.8 | 440 |
| 172 | 0.5 | 48.0 | 51.5 | 2.0 | 1,220 | 7.48 | 955 | 40.9 | 310 |
| 173 | 0.5 | 48.0 | 51.5 | 3.0 | 1,210 | 7.42 | 920 | 39.6 | 195 |

When determination was made of changes with temperature in the dielectric constant of samples No. 158 and 163 in Table IV above, there were observed the tendencies shown in FIG. 14. The samples displayed as high Curie points as 310 and 350° C. Determination was also made of the temperature characteristics of their electromechanical coupling coefficient Kr, the results being given in FIG. 15. Their high Curie points reduced the scope of changes with temperature in their electro-mechanical coupling coefficient Kr over a temperature range of −60 to 200° C., proving that a fully high electro-mechanical coupling coefficient Kr could be utilised under a stable condition.

EXAMPLE 11

There were prepared various combinations of raw materials, with addition of MnO₂ fixed to 0.5 percent by weight on the basis of the basic composition, the proportions of Pb(SbNb)₀.₅O₃ also fixed at 7.0 mol percent and the proportions of PbTiO₃ and PbZrO₃ varied in turn. Each sample was processed in substantially the same manner as in Example 1 to prepare a piezoelectric material. Determination was made of the relationship of piezoelectric properties versus composition of the sample, the results being given in FIG. 16.

EXAMPLE 12

There were prepared various combinations of raw materials, with addition of MnO fixed to 0.5 percent by weight on the basis of the basic composition and the proportions of Pb(SbNb)₀.₅O₃, PbTiO₃ and PbZrO₃ varied.

What we claim is:

1. A piezoelectric ceramic material consisting essentially of a basic composition indicated by the formula:

$$xPb(SbNb)_{0.5}O_3 - yPbTiO_3 - zPbZrO_3$$

where:
$x = 0.5$ to $25.0$ mol percent
$y = 36.0$ to $55.5$ mol percent
$z = 53.5$ to $20.5$ mol percent
$x + y + z = 100$ mol percent and at least one metal oxide selected from the group consisting of $ThO_2$ and $CeO_2$ in an amount of from 0.1 to 3 percent by weight based upon the basic composition.

References Cited

UNITED STATES PATENTS

| 3,544,471 | 12/1970 | Tsubouchi et al. | 252—62.9 |
| 3,268,453 | 8/1966 | Ouchi et al. | 252—62.9 |
| 3,376,226 | 4/1968 | Akashi et al. | 252—62.9 |
| 3,403,103 | 9/1968 | Ouchi et al. | 252—62.9 |
| 3,484,377 | 12/1969 | Tsubouchi et al. | 252—62.9 |
| 3,487,019 | 12/1969 | Tsubouchi et al. | 252—62.9 |

JAMES E. POER, Primary Examiner

J. COOPER, Assistant Examiner

U.S. Cl. X.R.

106—39 R